(12) United States Patent
Fan

(10) Patent No.: US 12,430,176 B2
(45) Date of Patent: Sep. 30, 2025

(54) CONTROLLING OPERATION OF EDGE COMPUTING NODES BASED ON KNOWLEDGE SHARING AMONG GROUPS OF THE EDGE COMPUTING NODES

(71) Applicant: Dell Products L.P., Round Rock, TX (US)

(72) Inventor: Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 620 days.

(21) Appl. No.: 17/718,478

(22) Filed: Apr. 12, 2022

(65) Prior Publication Data
US 2023/0305894 A1    Sep. 28, 2023

(30) Foreign Application Priority Data
Mar. 23, 2022   (CN) .......................... 202210292077.5

(51) Int. Cl.
G06F 9/50    (2006.01)

(52) U.S. Cl.
CPC .................................. G06F 9/5027 (2013.01)

(58) Field of Classification Search
CPC ............. G06F 9/5027; G06F 2209/505; G06F 9/5072; G06N 20/00
See application file for complete search history.

(56) References Cited

U.S. PATENT DOCUMENTS

| | | | |
|---|---|---|---|
| 10,791,063 B1* | 9/2020 | Florissi | H04L 47/783 |
| 2018/0045519 A1* | 2/2018 | Ghadiok | G06T 7/74 |
| 2018/0129967 A1* | 5/2018 | Herreshoff | G06N 20/00 |
| 2018/0204117 A1* | 7/2018 | Brevdo | G06N 20/00 |
| 2019/0138934 A1* | 5/2019 | Prakash | H04L 43/16 |
| 2019/0272887 A1* | 9/2019 | Feinberg | G16B 15/30 |

(Continued)

OTHER PUBLICATIONS

P. A. R. S. Costa et al., "Dependable and Secure Voting Mechanism in Edge Computing," Future Internet, vol. 11, No. 262, Dec. 15, 2019, 11 pages.

(Continued)

*Primary Examiner* — Kevin L Young
*Assistant Examiner* — Phuong N Hoang
(74) *Attorney, Agent, or Firm* — Ryan, Mason & Lewis, LLP

(57) ABSTRACT

An apparatus comprises a processing device configured to extract, from edge computing nodes in an edge computing environment, sets of knowledge parameters characterizing information generated by additional processing devices associated with the edge computing nodes. The processing device is also configured to generate groups of the edge computing nodes utilizing at least one clustering algorithm that takes into account the sets of knowledge parameters extracted from the edge computing nodes. A given group of the edge computing nodes comprises at least two edge computing nodes having respective sets of extracted knowledge parameters exhibiting at least a threshold level of similarity with one another. The processing device is further configured to control operation of the at least two edge computing nodes in the given group based at least in part on sharing knowledge parameters in the sets of knowledge parameters extracted from the at least two edge computing nodes.

20 Claims, 7 Drawing Sheets

(56) References Cited

U.S. PATENT DOCUMENTS

| | | | |
|---|---|---|---|
| 2020/0043046 A1* | 2/2020 | Chen | H04W 4/021 |
| 2020/0104688 A1* | 4/2020 | Benyahia | G06F 18/24 |
| 2021/0146919 A1* | 5/2021 | Xu | G08G 1/0112 |
| 2022/0261602 A1* | 8/2022 | Ma | G06F 40/20 |
| 2022/0318082 A1* | 10/2022 | Slinger | G06F 11/3409 |
| 2023/0028677 A1* | 1/2023 | Shelton, IV | G06F 3/167 |

OTHER PUBLICATIONS

J. D. Carroll et al., "Mulitdimensional Scaling," Chapter 3 in Measurement, Judgment, and Decision Making, Academic Press, 1998, pp. 179-250.

M. A. Carreira-Perpiñán, "A Review of Mean-shift Algorithms for Clustering," arXiv:1503.00687v1, Mar. 2, 2015, 28 pages.

M. C. Hout et al., "Multidimensional Scaling," WIREs Cognitive Science, vol. 4, No. 1, Jan./Feb. 2013, pp. 93-103.

\* cited by examiner

CONTROLLING OPERATION OF EDGE COMPUTING NODES BASED ON KNOWLEDGE SHARING AMONG GROUPS OF THE EDGE COMPUTING NODES

RELATED APPLICATION

The present application claims priority to Chinese Patent Application No. 202210292077.5, filed on Mar. 23, 2022 and entitled "Controlling Operation of Edge Computing Nodes based on Knowledge Sharing Among Groups of the Edge Computing Nodes," which is incorporated by reference herein in its entirety.

FIELD

The field relates generally to information processing, and more particularly to techniques for managing information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system.

However, significant challenges can arise in the management of services in cloud-based information processing systems. Similar challenges arise in other types of information processing systems.

Summary

Illustrative embodiments of the present disclosure provide techniques for controlling operation of edge computing nodes based at least in part on knowledge sharing among groups of the edge computing nodes.

In one embodiment, an apparatus comprises at least one processing device comprising a processor coupled to a memory. The at least one processing device is configured to perform the steps of extracting, from each of a plurality of edge computing nodes in an edge computing environment, a set of knowledge parameters characterizing information generated by a set of one or more additional processing devices associated with one of the plurality of edge computing nodes and generating two or more groups of the plurality of edge computing nodes utilizing at least one clustering algorithm that takes into account the sets of knowledge parameters extracted from each of the plurality of edge computing nodes. A given one of the two or more groups of the plurality of edge computing nodes comprises at least two of the plurality of edge computing nodes having respective sets of extracted knowledge parameters exhibiting at least a threshold level of similarity with one another. The at least one processing device is further configured to perform the step of controlling operation of the at least two of the plurality of edge computing nodes in the given one of the two or more groups of the plurality of edge computing nodes based at least in part on sharing one or more of the knowledge parameters in at least two of the sets of knowledge parameters extracted from the at least two of the plurality of edge computing nodes.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
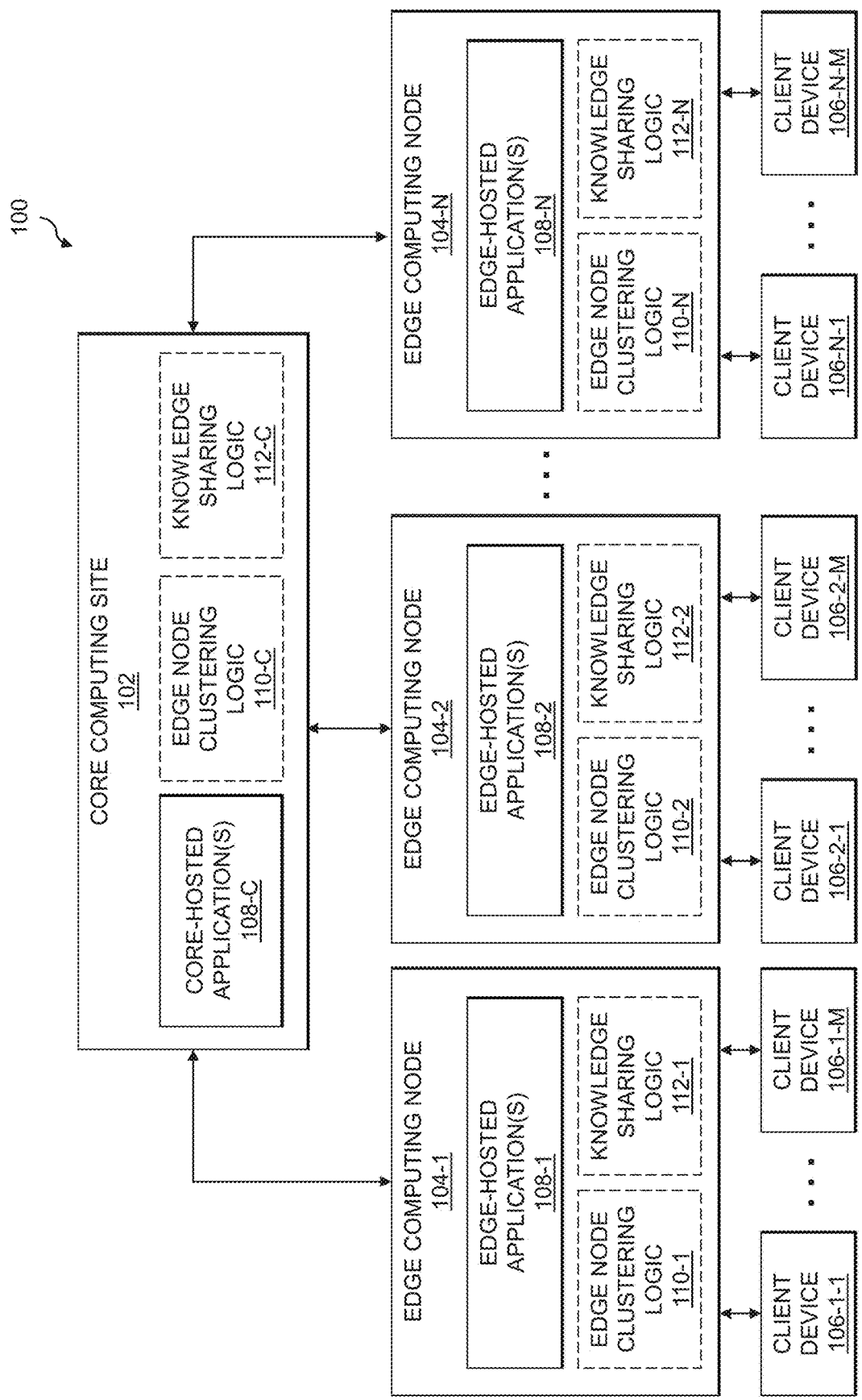
FIG. 1 is a block diagram of an information processing system configured for controlling operation of edge computing nodes based at least in part on knowledge sharing among groups of the edge computing nodes in an illustrative embodiment.

FIG. 1 shows an information processing system 100 configured in accordance with an illustrative embodiment. The information processing system 100 is assumed to be built on at least one processing platform and provides functionality for knowledge sharing among a core computing site 102 and a set of edge computing nodes 104-1, 104-2, . . . 104-N (collectively, edge computing nodes 104, also referred to as edge computing sites 104). The core computing site 102, also referred to as a core data center 102, is assumed to comprise a plurality of core devices or core nodes (not shown in FIG. 1) that run core-hosted applications 108-C. In some embodiments, the core computing site 102 comprises or is part of a cloud computing platform, and includes one or more clouds on which the core-hosted applications 108-C run. In such embodiments, the core-hosted applications 108-C may alternatively be referred to as cloud-hosted applications 108-C. Each of the edge computing nodes 104 is assumed to comprise one or more edge devices (not shown in FIG. 1) that run edge-hosted applications 108-1, 108-2, . . . 108-N (collectively, edge-hosted applications 108-E). The core-hosted applications 108-C and edge-hosted applications 108-E are collectively referred to as applications 108. As used herein, the term "application" is intended to be broadly construed to include applications, microservices, and other types of services.

The information processing system 100 includes a plurality of client devices that are coupled to each of the edge computing nodes 104. A set of client devices 106-1-1, . . . 106-1-M (collectively, client devices 106-1) are coupled to edge computing node 104-1, a set of client devices 106-2-1, . . . 106-2-M (collectively, client devices 106-2) are coupled to edge computing node 104-2, and a set of client devices 106-N-1, . . . 106-N-M (collectively, client devices 106-N) are coupled to edge computing node 104-N. The client devices 106-1, 106-2, . . . 106-N are collectively referred to as client devices 106. It should be appreciated that the particular number "M" of client devices 106 that are connected to each of the edge computing nodes 104 may be different. In other words, the number M of client devices 106-1 coupled to the edge computing node 104-1 may be the same as or different than the number M of client devices 106-2 coupled to the edge computing node 104-2. Further, a particular client device 106 may be connected or coupled to only a single one of the edge computing nodes 104 at any given time, or may be coupled to multiple ones of the edge computing nodes 104 at any given time, or may be connected to different ones of the edge computing nodes 104 at different times.

The client devices 106 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 106 may also or alternately comprise virtualized computing resources, such as virtual machines (VMs), containers, etc.

The client devices 106 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The networks coupling the client devices 106, the edge computing nodes 104 and the core computing site 102 are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network (e.g., a public network) couples the client devices 106 to the edge computing nodes 104, while a second type of network (e.g., a private network) couples the edge computing nodes 104 to the core computing site 102.

In some embodiments, the core computing site 102 and edge computing nodes 104 collectively provide at least a portion of an information technology (IT) infrastructure operated by an enterprise, where the client devices 106 are operated by users of the enterprise. The IT infrastructure comprising the core computing site 102 and the edge computing nodes 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the core computing site 102 and/or the edge computing nodes 104. A given enterprise system may host assets that are associated with multiple enterprises (e.g., two or more different businesses, organizations or other entities).

Although not explicitly shown in FIG. 1, one or more input-output devices such as keyboards, displays or other types of input-output devices may be used to support one or more user interfaces to the core computing site 102 and the edge computing nodes 104, as well as to support communication between the core computing site 102, the edge computing nodes 104, and other related systems and devices not explicitly shown.

As noted above, the core computing site 102 hosts core-hosted applications 108-C and the edge computing nodes 104 host edge-hosted applications 108-E, where the core-hosted applications 108-C and the edge-hosted applications 108-E are collectively referred to as applications 108. The client devices 106 send requests to access the applications 108 to the edge computing nodes 104 (e.g., to edge computing devices thereof). If a given request from one of the client devices 106 (e.g., client device 106-1-1) is directed to one of the edge-hosted applications 108-1 at the edge computing node 104-1, the edge computing node 104-1 will service the given request and provide a response (if applicable) to the requesting client device 106-1-1. If the given request is directed to one of the core-hosted applications 108-C, the edge computing node 104-1 will forward the given request to the core computing site 102. The core computing site 102 will service the given request, and provide a response (if applicable) back to the edge computing node 104-1, which will in turn provide the response back to the requesting client device 106-1-1.

It should be noted that, in some embodiments, requests and responses or other information may be routed through multiple edge computing nodes. While FIG. 1 shows an embodiment where edge computing node 104 is connected directly to the core computing site 102, this is not a requirement. In other embodiments, one or more of the edge computing nodes 104 may be connected to the core computing site 102 via one or more other ones of the edge computing nodes 104 (e.g., the edge computing nodes 104 may be arrange in a hierarchy with multiple levels, possibly including one or more edge datacenters that couple the edge computing nodes 104 with the core computing site 102).

Different ones of the applications 108 may have different required performance or other characteristics. As a result, it may be more advantageous for certain ones of the applications 108 to be hosted at the core computing site 102 or one or more of the edge computing nodes 104, based on the required performance, metrics or other characteristics of the applications 108. Further, the required performance, metrics or other characteristics of the applications 108 may change over time, such that a given application hosted on one of the edge computing nodes 104 at a first time may be better suited for hosting by the core computing site 102 at a second time, or vice versa. In illustrative embodiments, the edge computing nodes 104 and the core computing site 102 implement respective instances of application tiering logic that provides for dynamic allocation of processing locations for the applications 108 at the core computing site 102 and the edge computing nodes 104. The application processing location may be set when applications 108 are initiated, and may be refined or dynamically adjusted over time in response to various conditions (e.g., a request from one of the client devices 106 to perform re-balancing, changes in application requirements, periodically, changes in workload or relative workloads of different ones of the edge computing nodes 104, etc.).

In some cases, two or more of the edge computing nodes 104 may benefit from knowledge (e.g., information) sharing with one another. Two or more of the edge computing nodes 104, for example, may be coupled to similar (e.g., exhibiting at least some threshold level of similarity) sets of client devices 106 (e.g., IoT devices), such that information collected from such client devices 106 is similar or the same, or information that is to be provided to such client devices 106 is similar or the same. Through implementation of knowledge sharing amongst such similar edge computing nodes 104, various efficiencies may be achieved (e.g., reduced consumption of computing, storage, network or other resources). Consider, as an example, where information from the client devices 106 is collected by the edge computing nodes 104 and used in one or more machine learning models of one or more of the applications 108 (e.g., either or both of the edge-hosted applications 108-E and core-hosted applications 108-C). If both the edge computing node 104-1 and edge computing node 104-2 are coupled to sets of client devices 106-1 and 106-2 that provide the same or similar (e.g., exhibiting at least some threshold level of similarity) data, it may not be necessary or beneficial to utilize network resources for transferring such similar (e.g., redundant) data to such applications 108 (e.g., for training or running inference in machine learning models thereof). Further, reducing such data transmission will not only save network resources but can also save computing resources required for analyzing such redundant data in the applications 108.

Knowledge sharing can also be used for providing instructions to the client devices 106 via the edge computing nodes 104. For example, the core-hosted applications 108-C running at the core computing site 102 may analyze data that is collected from the client devices 106 to perform various analysis, and provide the results of such analysis back to the client devices 106 via the edge computing nodes 104, or back to edge-hosted applications 108-E at the edge computing nodes 104. If two or more edge computing nodes 104 are connected to similar sets of client devices 106, it may be the case that the results of analysis to be provided to multiple ones of the client devices 106 or edge-hosted applications 108-E may be the same or similar (e.g., exhibiting at least some threshold level of similarity), such that the core computing site 102 can transmit the results of analysis to one or only a few of the edge computing nodes 104, which can in turn transmit the results of analysis to one another and/or the client devices 106 connected thereto. Various other examples of knowledge sharing are possible.

In the FIG. 1 embodiments, the core computing site 102 implements edge node clustering logic 110-C and knowledge sharing logic 112-C, and the edge computing nodes 104-1, 104-2, . . . 104-N implement respective instances of edge node clustering logic 110-1, 110-2, . . . 110-N and knowledge sharing logic 112-1, 112-2, . . . 112-N. The edge node clustering logic 110-1, 110-2, . . . 110-N and 110-C are collectively referred to as edge node clustering logic 110, and the knowledge sharing logic 112-1, 112-2, . . . 112-N and 112-C are collectively referred to as knowledge sharing logic 112. The edge node clustering logic 110 is configured to cluster the edge computing nodes 104 into one or more groups that will share knowledge with one another, and the knowledge sharing logic 112 is configured to implement knowledge sharing among the groups of edge computing nodes 104. It should be noted that, in some cases, edge computing nodes 104 may be part of or associated with multiple edge computing node groups or clusters. For example, a particular one of the edge computing nodes 104, such as edge computing node 104-1, may host two or more edge-hosted applications 108-1, with knowledge sharing for a first one of the two or more edge-hosted applications 108-1 being performed with a first subset of the other edge computing nodes 104 and with knowledge sharing for at least a second one of the two or more edge-hosted applications 108-2 being performed with a second subset of the other edge computing nodes 104. In a similar manner, knowledge sharing may be performed for different subsets of the client devices 106-1 that are connected to the edge computing node 104-1 (e.g., the edge computing node 104-1 may be part of a first edge computing node group for a first subset of the client devices 106-1 connected thereto, and may be part of at least a second edge computing node group for a second subset of the client devices 106-1 connected thereto).

In some embodiments, information associated with the applications 108 (e.g., knowledge that may be shared using knowledge sharing logic 112 among groups of the edge computing nodes 104 clustered using the edge node clustering logic 110) may be stored in a database or other data store. The database or other data store may be implemented using one or more storage systems that are part of or otherwise associated with one or more of the core computing site 102, the edge computing nodes 104, and/or the client devices 106. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as an element of the core computing site 102 and the edge computing nodes 104 in this embodiment, the edge node clustering logic 110 and/or knowledge sharing logic 112 in other embodiments can be implemented at least in part externally to the core computing site 102 and/or the edge computing nodes 104, for example, as a stand-alone server, set of servers or other type of system coupled via one or more networks to the core computing site 102 and/or the edge computing nodes 104. In some embodiments, the edge node clustering logic 110 and/or knowledge sharing logic 112 may be implemented at least in part within one or more of the client devices 106. In still other embodiments, the edge node clustering logic 110 and/or knowledge sharing logic 112 may be implemented at a subset of the core computing site 102 and the edge computing nodes 104, rather than having instances implemented at both the core computing site 102 and each of the edge computing nodes 104. Various other examples are possible.

The core computing site 102 and the edge computing nodes 104 in the FIG. 1 embodiment are assumed to be implemented using at least one processing device. Each such processing device generally comprises at least one processor and an associated memory, and implements at least a portion of the functionality of the edge node clustering logic 110 and the knowledge sharing logic 112.

It is to be appreciated that the particular arrangement of the core computing site 102, the edge computing nodes 104, the client devices 106, the applications 108, the edge node clustering logic 110 and the knowledge sharing logic 112 illustrated in the FIG. 1 embodiment is presented by way of example only, and alternative arrangements can be used in other embodiments. As discussed above, for example, the edge node clustering logic 110 and/or the knowledge sharing logic 112 may be implemented external to one or both of the core computing site 102 and the edge computing nodes 104. At least portions of the edge node clustering logic 110 and/or the knowledge sharing logic 112 may be implemented at least in part in the form of software that is stored in memory and executed by a processor.

It is to be understood that the particular set of elements shown in FIG. 1 for controlling operation of edge computing nodes based at least in part on knowledge sharing among groups of the edge computing nodes is presented by way of illustrative example only, and in other embodiments additional or alternative elements may be used. Thus, another embodiment may include additional or alternative systems, devices and other network entities, as well as different arrangements of modules and other components.

The core computing site 102, the edge computing nodes 104, the client devices 106 and other portions of the system 100, as will be described above and in further detail below, may be part of cloud infrastructure.

The core computing site 102, the edge computing nodes 104, the client devices 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The core computing site 102, the edge computing nodes 104, and the client devices 106, or components thereof, may be implemented on respective distinct processing platforms, although numerous other arrangements are possible. For example, in some embodiments at least portions of the client devices 106 and the edge computing nodes 104 are implemented on the same processing platform. One or more of the client devices 106 can therefore be implemented at least in part within at least one processing platform that implements at least a portion of the edge computing nodes 104 and/or the core computing site 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the core computing site 102, the edge computing nodes 104 and the client devices 106, or portions or components thereof, to reside in different data centers. Numerous other distributed implementations are possible.

Additional examples of processing platforms utilized to implement the core computing site 102, the edge computing nodes 104 and the client devices 106 and other components of the system 100 in illustrative embodiments will be described in more detail below in conjunction with FIGS. 6 and 7.

It is to be appreciated that these and other features of illustrative embodiments are presented by way of example only, and should not be construed as limiting in any way.

An exemplary process for controlling operation of edge computing nodes based at least in part on knowledge sharing among groups of the edge computing nodes will now be described in more detail with reference to the flow diagram of FIG. 2. It is to be understood that this particular process is only an example, and that additional or alternative processes for controlling operation of edge computing nodes based at least in part on knowledge sharing among groups of the edge computing nodes may be used in other embodiments.

In this embodiment, the process includes steps 200 through 204. These steps are assumed to be performed by the core computing site 102 and the edge computing nodes 104 utilizing the edge node clustering logic 110 and the knowledge sharing logic 112. The process begins with step 200, extracting, from each of a plurality of edge computing nodes (e.g., edge computing nodes 104) in an edge computing environment, a set of knowledge parameters characterizing information generated by a set of one or more processing devices (e.g., client devices 106, internal edge devices of the edge computing nodes 104, combinations thereof, etc.) coupled to or associated with that one of the plurality of edge computing nodes. In some embodiments, a given set of one or more processing devices coupled to a given one of the plurality of edge computing nodes comprises a plurality of IoT devices, and a given set of knowledge parameters extracted from the given edge computing node comprises IoT sensor data generated from the plurality of IoT devices. In other embodiments, a given set of knowledge parameters extracted from a given one of the plurality of edge computing node comprises device-generated control information from a given set of one or more processing devices coupled to the given one of the plurality of edge computing nodes.

In step 202, two or more groups of the plurality of edge computing nodes are generated utilizing at least one clustering algorithm that takes into account the sets of knowledge parameters extracted from each of the plurality of edge computing nodes. A given one of the two or more groups of the plurality of edge computing nodes comprises at least two of the plurality of edge computing nodes having respective sets of extracted knowledge parameters exhibiting at least a threshold level of similarity with one another. Step 202 may comprise, prior to application of the at least one clustering algorithm, performing dimension reduction for the sets of knowledge parameters extracted from each of the plurality of edge computing nodes. Performing the dimension reduction for the sets of knowledge parameters extracted from each of the plurality of edge computing nodes may comprise applying multidimensional scaling. Applying multidimensional scaling may comprise generating a distance matrix characterizing distances between respective pairs of the knowledge parameters in the sets of knowledge parameters extracted from each of the plurality of edge computing nodes. Generating the distance matrix may comprise computing Euclidean distance between the respective pairs of the knowledge parameters in the sets of knowledge parameters extracted from each of the plurality of edge computing nodes. The at least one clustering algorithm may comprise a mean-shift clustering algorithm. The mean-shift clustering algorithm assigns respective ones of the plurality of edge computing nodes to respective ones of the two or more groups of the plurality of edge computing nodes by shifting the plurality of edge computing nodes towards a mode comprising a highest density of data points corresponding to other ones of the plurality of edge computing nodes in a same region.

Figure 2:
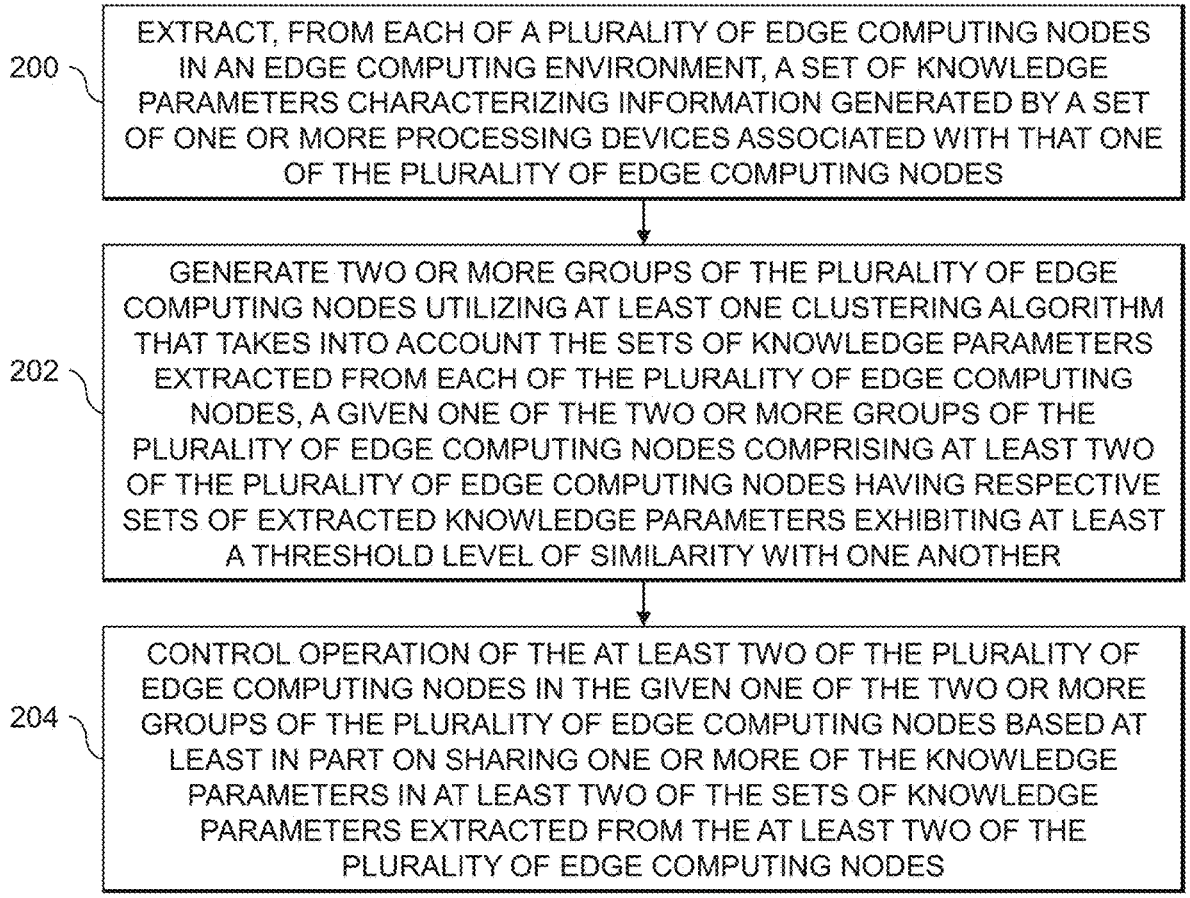
FIG. 2 is a flow diagram of an exemplary process for controlling operation of edge computing nodes based at least in part on knowledge sharing among groups of the edge computing nodes in an illustrative embodiment.

The FIG. 2 process continues with step 204, controlling operation of the at least two of the plurality of edge computing nodes in the given one of the two or more groups of the plurality of edge computing nodes based at least in part on sharing one or more of the knowledge parameters in at least two of the sets of knowledge parameters extracted from the at least two of the plurality of edge computing nodes. Sharing the one or more of the knowledge parameters in at least two of the sets of knowledge parameters extracted from the at least two of the plurality of edge computing nodes may comprise reducing an amount of the knowledge parameters in the at least two sets of knowledge parameters extracted from the at least two of the plurality of edge computing nodes that are at least one of: utilized in performing at least one of training and inference of one or more machine learning models; transmitted from the edge computing environment to one or more cloud computing platforms; and used in generating sets of controls for the at least two of the plurality of edge computing nodes in the given one of the two or more groups of the plurality of edge computing nodes.

The given one of the two or more groups of the plurality of edge computing nodes may comprise a group of autonomous vehicles, and sharing one or more of the knowledge parameters may comprise utilizing vehicle data from one or more representative ones of the autonomous vehicles in the group of autonomous vehicles for performing obstacle analysis. The given one of the two or more groups of the plurality of edge computing nodes may alternatively comprise a group of irrigation control systems, and sharing one or more of the knowledge parameters may comprise utilizing at least one of sensor data and control data from one or more representative ones of the irrigation control systems for generating one or more controls for each of the irrigation control systems in the group of irrigation control systems.

Cloud computing can provide significant benefits, including in improving decision-making, offering reduced IT costs and scalability, etc. Edge computing provides another option, which offers faster response time and increased data security relative to cloud computing. As IoT devices become more widespread and powerful, organizations seek to implement effective edge computing architectures to leverage the potential and benefits of edge computing technology, including where edge computing technology is combined with cloud computing technology.

In an IoT network, there may be a large number of edge computing nodes (also referred to herein as edge nodes) that are structured hierarchically, and which are located between one or more IoT devices and one or more core nodes of a core computing site (e.g., cloud servers of one or more cloud computing platforms). Each edge node collects data from one or more of the IoT devices, or potentially from one or more other edge nodes. The data that is collected by different edge nodes (e.g., from different subsets of IoT devices or other edge nodes) may be the same (e.g., exhibiting at least some threshold level of similarity), or different. There is a need for determining and evaluating the similarity of data or "knowledge" of different edge nodes, where such similarity can be leveraged to provide improved information sharing on-demand among different edge nodes for different customized application scenarios.

One example customized application scenario includes autonomous vehicles, where edge nodes (e.g., autonomous vehicles) collect and transfer data to one or more cloud computing platforms or an edge datacenter for various tasks. An example task is obstacle analysis computations, where obstacle analysis models (e.g., machine learning models) can be intelligently learnt and updated based on the information collected from the autonomous vehicles. If all of the collected data from all of the edge nodes (e.g., autonomous vehicles) is used for learning, the computing complexity may be very high and resource-intensive. If, however, the edge nodes (e.g., autonomous vehicles) can be sorted and classified according to their similarity to one another, then a more limited subset of the collected data (e.g., from one or more representative autonomous vehicles in each group of autonomous vehicles exhibiting at least a threshold level of similarity to one another) may be transmitted to a cloud computing platform or edge datacenter for model learning. This will advantageously improve the efficiency of model learning and can save considerable resources (e.g., computing resources, storage resources, network resources, etc.).

Another example customized application scenario includes an intelligent irrigation system, where edge nodes (e.g., parks or other facilities) collect information from sets of IoT sensors (e.g., irrigation metrics). If multiple parks or other facilities have the same or similar (e.g., exhibiting at least some threshold level of similarity) physical irrigation configurations and requirements, efficiencies can be achieved through uploading and analyzing data from only one (or comparatively few) edge nodes. This can save considerable resources (e.g., computing resources, storage resources, network resources, etc.).

Illustrative embodiments provide techniques for smart knowledge sharing among edge nodes. In some embodiments, a smart knowledge sharing mechanism extracts features of the knowledge that each edge node wants to share. Multidimensional scaling (MDS) and mean-shift algorithms are used to evaluate the edge nodes' similarity, and for clustering edge nodes into different groups. Edge nodes belonging to the same group can share knowledge on demand. In this way, the edge nodes can get better and more valuable knowledge from each other to perform more effective and efficient analysis and decision-making.

Figure 3:
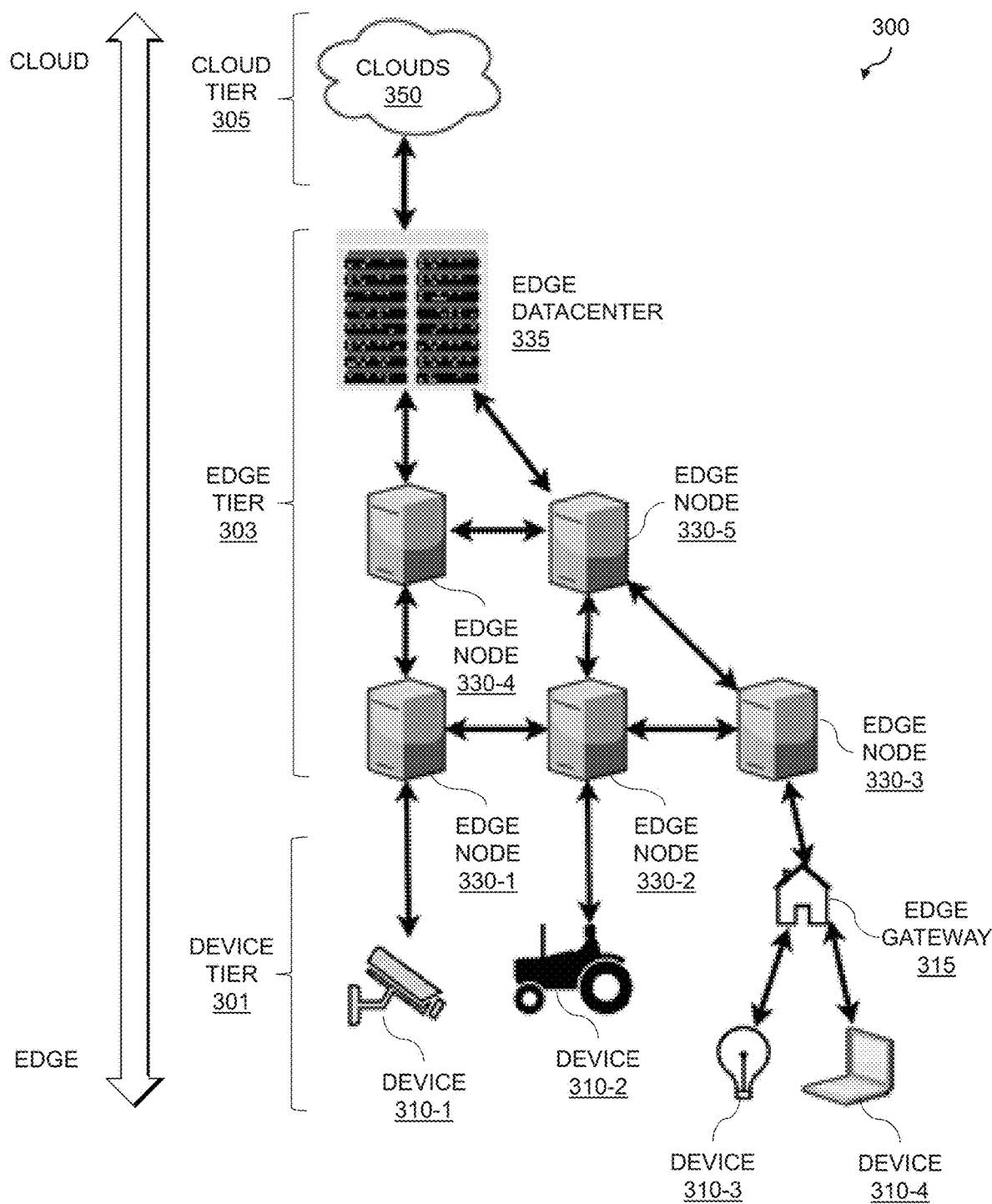
FIG. 3 shows an architecture of an Internet of Things edge network in an illustrative embodiment.

FIG. 3 shows an example architecture 300 of an IoT network, including a device tier 301, and edge tier 303 and a cloud tier 305. The device tier 301 corresponds to the endpoints of the IoT network, where a set of IoT devices 310-1, 310-2, 310-3 and 310-4 (collectively, IoT devices 310) act as data sources. Optionally, some of the IoT devices 310 are connected to edge gateways. In the FIG. 3 example, IoT devices 310-3 and 310-4 are coupled to edge gateway 315. The edge tier 303 includes network devices, such as routers, gateways and switches, that are capable of processing, computing and temporarily storing the received information. The edge tier 303 is composed of a group of edge nodes 330-1, 330-2, 330-3, 330-4 and 330-5 (collectively, edge nodes 330) that are structured hierarchically and which are located between the device tier 301 and cloud tier 305. The edge nodes 330 are devices (e.g., routers, gateways, switches, other network or processing devices, etc.) that are capable of routing network traffic. The edge nodes 330 may possess high computing power, and can range from base stations, routers, switches and small-scale datacenters. In the FIG. 3 example, edge nodes 330-4 and 330-5 are coupled to edge datacenter 335. The cloud tier 305 includes one or more clouds 350, which provide cloud intelligence and which can store and process an enormous amount of data (e.g., depending on the capabilities of the clouds 350).

Figure 4:
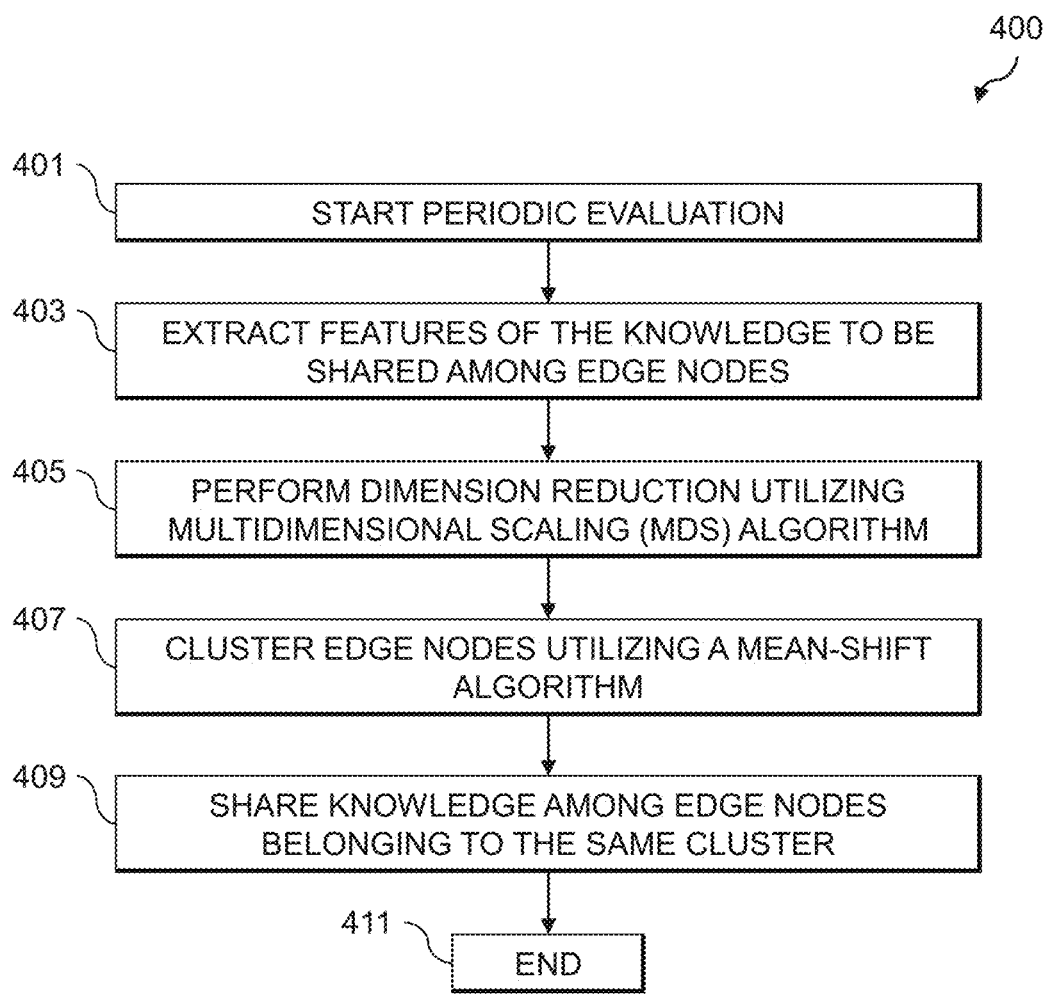
FIG. 4 shows a process flow for clustering edge nodes into groups in an illustrative embodiment.

FIG. 4 shows a process flow 400 for edge node knowledge sharing, which includes periodic evaluation of the similarity of edge nodes and clustering of edge nodes (e.g., edge nodes 330) into edge node groups. The process flow 400 can advantageously be used for effectively evaluating different edge nodes' similarity, to better share needed information among the edge nodes. As will be described in further detail below, MDS and mean-shift algorithms are used for clustering the edge nodes into different groups.

The process flow 400 starts 401 a particular instance of the periodic evaluation, and in step 403 extracts features of the knowledge to be shared among edge nodes. Assume, for example, that there are N parameters of knowledge that can be extracted from edge nodes, represented as $X=\{x_1, x_2, \ldots, x_N\}$ for an edge node X. Usually, the features or parameters count of an edge node is large. For example, in an intelligent irrigation system, there might be different sensor-generated data (e.g., temperature, humidity, soil, moisture, ontology decisions, light, rain, flow, etc.), as well as different device-generated data (e.g., from water pumps, batteries, liquid crystal displays (LCDs), solenoid valves, etc.).

To handle the large number of features or parameters, dimension reduction is performed in step 405 utilizing a MDS algorithm. MDS provides a mechanism for visualizing or determining the level of similarity of individual cases of a dataset. Assume, for example, that there are a total of M edge nodes, with each of the M edge nodes (e.g., denoted $X_1, X_2, \ldots, X_M$) being defined with N features of knowledge. A distance matrix of the features of the edge nodes can thus be defined $$D = \begin{pmatrix} d_{11} & \cdots & d_{1N} \\ \vdots & \ddots & \vdots \\ d_{M1} & \cdots & d_{MN} \end{pmatrix},$$

where $d_{ij}$ represents the distance (e.g., a Euclidean distance or other suitable distance metric) between the ith and jth features (e.g., $d_{ij}=\|x_i-x_j\|$). Following application of the MDS algorithm, it is assumed that the number of features can be reduced to L dimensions.

In step 407, the edge nodes are clustered into groups using a clustering algorithm. In some embodiments, a mean-shift clustering algorithm is utilized. The mean-shift clustering algorithm can advantageously cluster the edge nodes into groups, where the total number of groups does not need to be specified in advance (e.g., the total number of groups may be unknown before application of the mean-shift clustering algorithm). The mean-shift clustering algorithm assigns data points to clusters (or groups) iteratively by shifting points toward the mode (e.g., where the mode is the highest density of data points in the region in the context of the mean-shift clustering algorithm). Unlike other clustering algorithms (e.g., such as K-mean clustering), mean-shift clustering algorithms do not require the total number of clusters to be specified in advance. The number of clusters is determined by the mean-shift clustering algorithm based on the data. Thus, mean-shift clustering is well-suited for use in edge node clustering. It should be appreciated that while various embodiments are described with respect to use of mean-shift clustering, various other types of clustering algorithms (e.g., including supervised and unsupervised machine learning algorithms, such as K-means clustering) may be used in other embodiments. Following step 407, the edge nodes are clustered into different groups according to their similarity.

In step 409, knowledge sharing is performed among edge nodes belonging to the same groups or clusters. Once the edge nodes are clustered into groups, knowledge can be shared among the edge nodes belonging to the same group. The process flow 400 then ends in step 411. As noted above, however, the process flow 400 may be repeated periodically or as desired (e.g., in response to the addition or removal of edge nodes, edge datacenters, edge gateways or IoT devices, in response to expiration of some designated period of time, in response to an explicit user request from an authorized user, etc.).

Knowledge sharing among edge nodes may involve sharing of different types of information based on the application scenario. As an example, consider obstacle analysis for autonomous vehicles. After the autonomous vehicles are evaluated and clustered into groups with high similarity using the process flow 400, a data center (e.g., edge datacenter 335, clouds 350) can use the same groups' vehicles data to perform target model learning for each group of autonomous vehicles. With more useful and relevant inputs, the model learning in such a scenario will be more effective and efficient. As another example, consider an intelligent irrigation system where multiple edge nodes may have similar or almost the same (e.g., exhibiting at least some threshold level of similarity) physical configuration and requirements. In such a case, only one or relatively few edge node's data needs to be uploaded to a data center (e.g., edge datacenter 335, clouds 350) and used to analyze and make decisions. Thus, storage, network and computing resources are saved.

Figure 5:
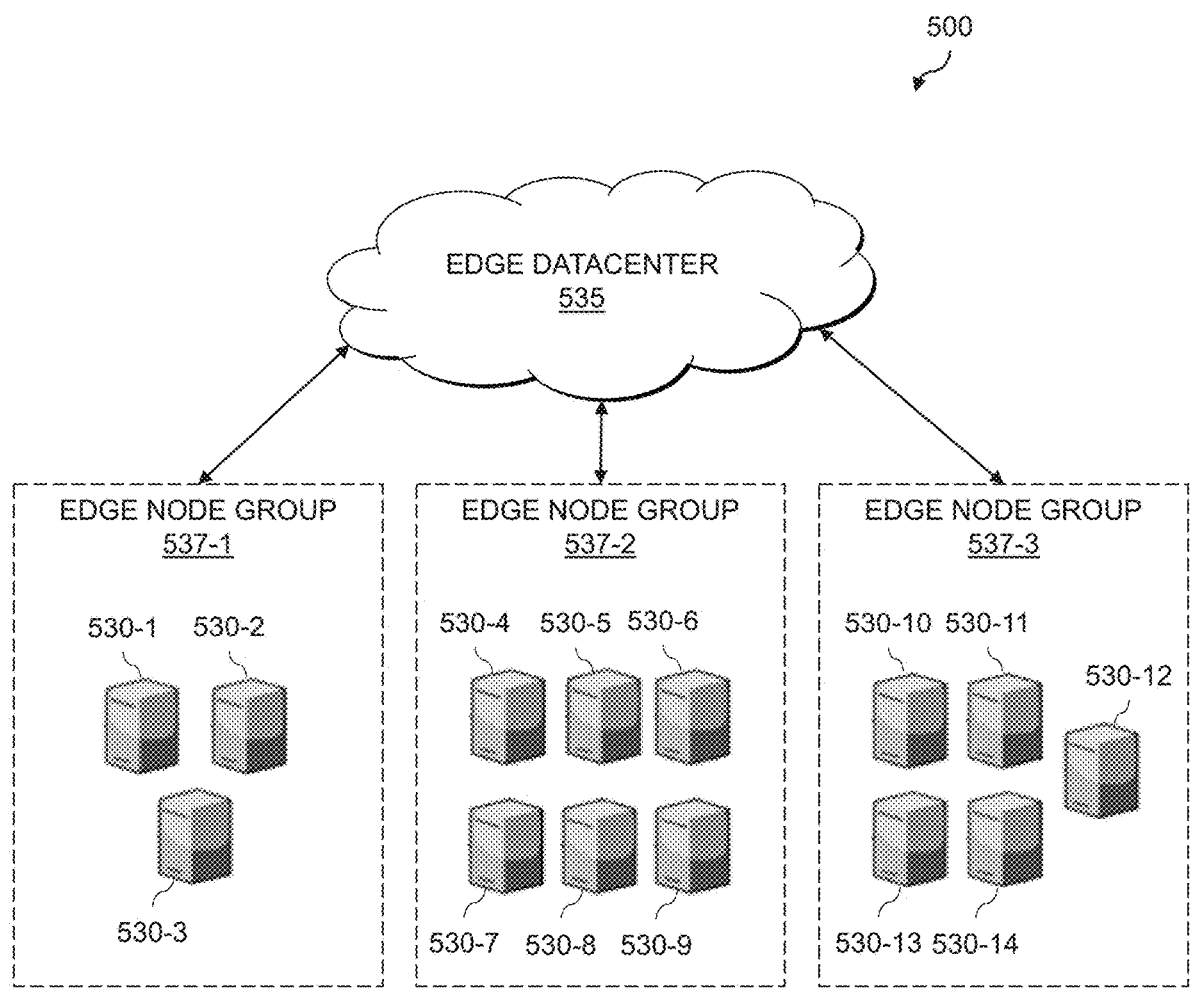
FIG. 5 shows clustering of edge nodes in an edge environment into edge node groups in an illustrative embodiment.

FIG. 5 shows an example of an edge computing environment 500 following application of the process flow 400 to form groups of edge nodes. The edge computing environment 500 includes edge nodes 530-1 through 530-14 (collectively, edge nodes 530) and an edge datacenter 535. The edge nodes 530-1, 530-2 and 530-3 are clustered into edge node group 537-1. The edge nodes 530-4, 530-5, 530-6, 530-7, 530-8 and 530-9 are clustered into edge node group 537-2. The edge nodes 530-10, 530-11, 530-12, 530-13 and 530-14 are clustered into edge node group 537-3. The edge node groups 537-1, 537-2 and 537-3 (collectively, edge node groups 537) share knowledge with one another. The edge node groups 537 include sets of the edge nodes 530 which are similar to one another, such that the edge nodes 530 belonging to each of the edge node groups 537 can share knowledge to one another. In this way, the edge nodes 530 obtain better and more valuable knowledge, while also enabling more effective and efficient analysis, decision making, model training, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for controlling operation of edge computing nodes based at least in part on knowledge sharing among groups of the edge computing nodes will now be described in greater detail with reference to FIGS. 6 and 7. Although described in the context of system 100, these platforms may also be used to implement at least portions of other information processing systems in other embodiments.

Figure 6:
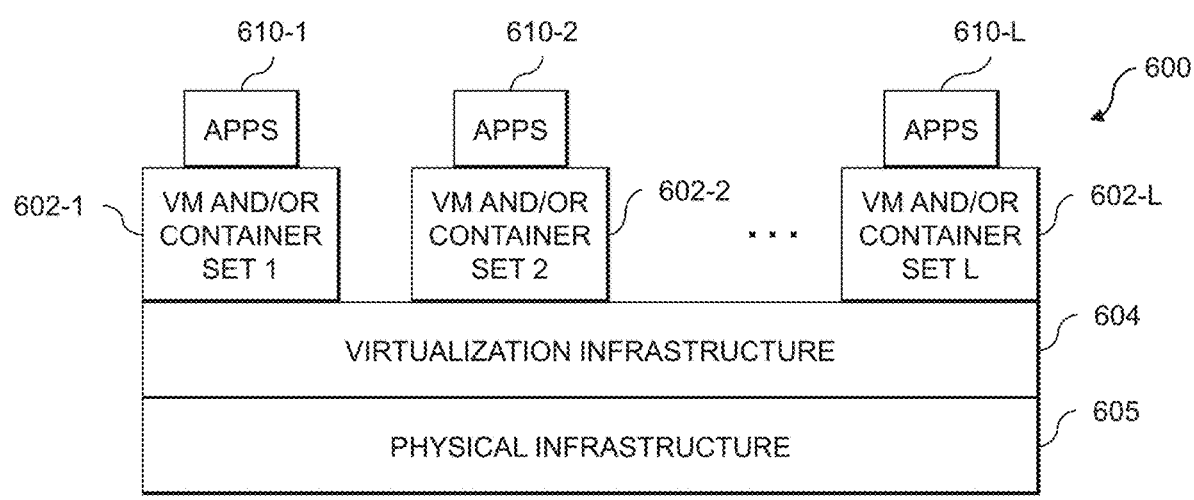
FIGS. 6 and 7 show examples of processing platforms that may be utilized to implement at least a portion of an information processing system in illustrative embodiments.
Figure 7:
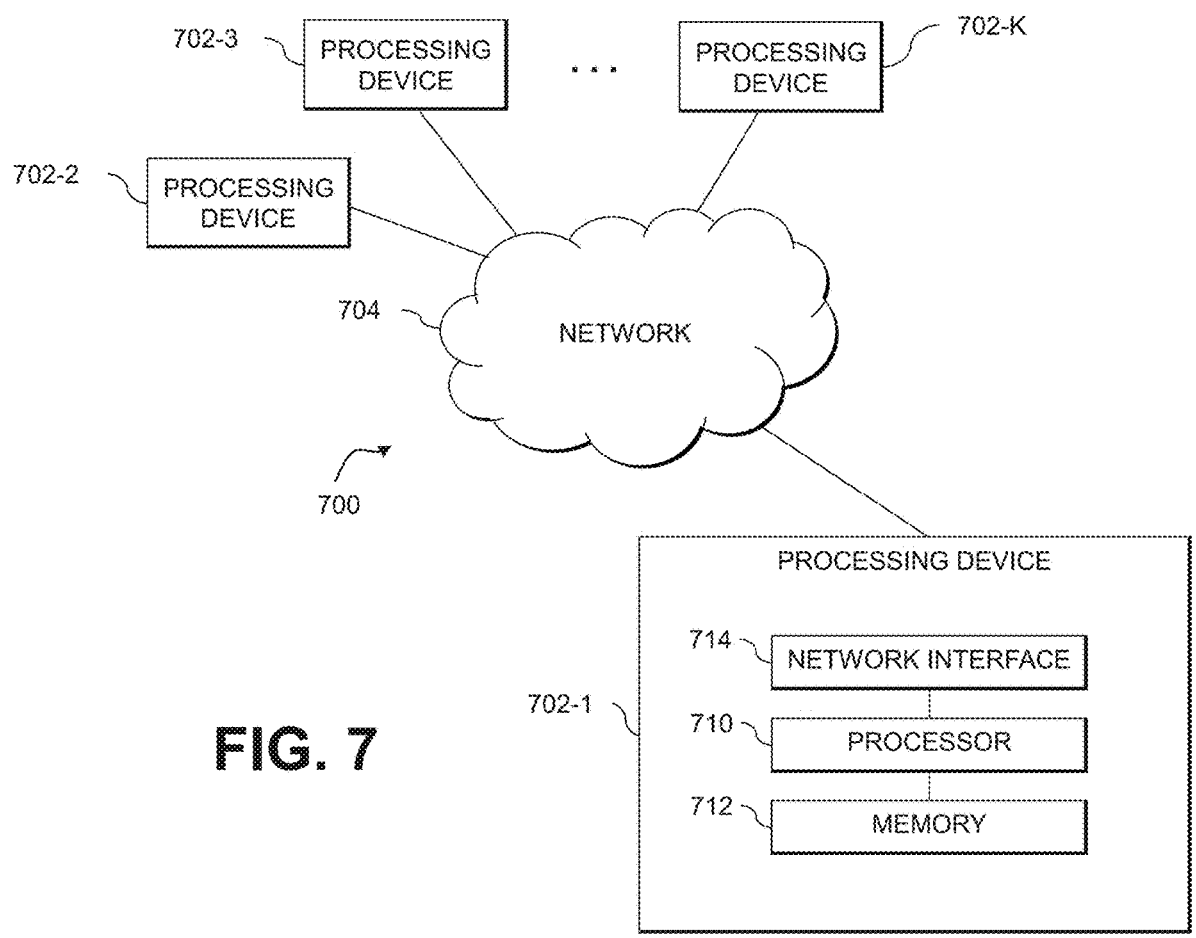

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for controlling operation of edge computing nodes based at least in part on knowledge sharing among groups of the edge computing nodes as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, extracted knowledge parameters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
extracting, from each of a plurality of edge computing nodes in an edge computing environment, a set of knowledge parameters characterizing information generated by a set of one or more additional processing devices associated with that one of the plurality of edge computing nodes;
generating two or more groups of the plurality of edge computing nodes utilizing at least one clustering algorithm that takes into account the sets of knowledge parameters extracted from each of the plurality of edge computing nodes and physical configurations of the sets of one or more additional processing devices associated with each of the plurality of edge computing nodes, a given one of the two or more groups of the plurality of edge computing nodes comprising at least two of the plurality of edge computing nodes having (i) respective sets of extracted knowledge parameters exhibiting at least a threshold level of similarity with one another and (ii) respective ones of the sets of one or more additional processing devices associated with the at least two of the plurality of edge computing nodes having physical configurations exhibiting at least a threshold level of similarity with one another;
controlling operation of the at least two of the plurality of edge computing nodes in the given one of the two or more groups of the plurality of edge computing nodes based at least in part on sharing one or more of the knowledge parameters in at least two of the sets of knowledge parameters extracted from the at least two of the plurality of edge computing nodes;
wherein controlling the operation of the at least two of the plurality of edge computing nodes in the given one of the two or more groups of the plurality of edge computing nodes comprises generating a first instance of a machine learning model for the given one of the two or more groups of the plurality of edge computing nodes based at least in part on the shared one or more of the knowledge parameters in the at least two of the sets of knowledge parameters extracted from the at least two of the plurality of edge computing nodes in the given one of the two or more groups of the plurality of edge computing nodes; and
wherein the first instance of the machine learning model generated for the given one of the two or more groups of the plurality of edge computing nodes is different than one or more other instances of the machine learning model generated for one or more other ones of the two or more groups of the plurality of edge computing nodes;
executing the first instance of the machine learning model generated for the given one of the two or more groups of the plurality of edge computing nodes on at least one of the edge computing nodes that is part of the given one of the two or more groups of the plurality of edge computing nodes; and
executing the one or more other instances of the machine learning model generated for the one or more other ones of the two or more groups of the plurality of edge computing nodes on at least one of the edge computing nodes that is part of each of the one or more other ones of the two or more groups of the plurality of edge computing nodes.

2. The apparatus of claim 1 wherein the set of one or more additional processing devices associated with a given one of the plurality of edge computing nodes comprises a plurality of Internet of Things (IoT) devices, and wherein a given set of knowledge parameters extracted from the given edge computing node comprises IoT sensor data generated from the plurality of IoT devices.

3. The apparatus of claim 1 wherein a given set of knowledge parameters extracted from a given one of the plurality of edge computing nodes comprises device-generated control information from a given set of one or more additional processing devices coupled to the given one of the plurality of edge computing nodes.

4. The apparatus of claim 1 wherein generating the two or more groups of the plurality of edge computing nodes further comprises, prior to application of the at least one clustering algorithm, performing dimension reduction for the sets of knowledge parameters extracted from each of the plurality of edge computing nodes.

5. The apparatus of claim 4 wherein performing the dimension reduction for the sets of knowledge parameters extracted from each of the plurality of edge computing nodes comprises applying multidimensional scaling.

6. The apparatus of claim 5 wherein applying multidimensional scaling comprises generating a distance matrix characterizing distances between respective pairs of the knowledge parameters in the sets of knowledge parameters extracted from each of the plurality of edge computing nodes.

7. The apparatus of claim 6 wherein generating the distance matrix comprises computing Euclidean distance between the respective pairs of the knowledge parameters in the sets of knowledge parameters extracted from each of the plurality of edge computing nodes.

8. The apparatus of claim 1 wherein the at least one clustering algorithm comprises a mean-shift clustering algorithm.

9. The apparatus of claim 8 wherein the mean-shift clustering algorithm assigns respective ones of the plurality of edge computing nodes to respective ones of the two or more groups of the plurality of edge computing nodes by shifting the plurality of edge computing nodes towards a mode comprising a highest density of data points corresponding to other ones of the plurality of edge computing nodes in a same region.

10. The apparatus of claim 1 wherein sharing the one or more of the knowledge parameters in the at least two of the sets of knowledge parameters extracted from the at least two of the plurality of edge computing nodes comprises reducing an amount of the knowledge parameters in the at least two of the sets of knowledge parameters extracted from the at least two of the plurality of edge computing nodes in the given one of the two or more groups of the plurality of edge computing nodes that are utilized in performing at least one of training and inference for the first instance of the machine learning model generated for the given one of the two or more groups of the plurality of edge computing nodes.

11. The apparatus of claim 1 wherein sharing the one or more of the knowledge parameters in the at least two of the sets of knowledge parameters extracted from the at least two of the plurality of edge computing nodes comprises reducing an amount of the knowledge parameters in the at least two of the sets of knowledge parameters extracted from the at least two of the plurality of edge computing nodes that are transmitted from the edge computing environment to one or more cloud computing platforms.

12. The apparatus of claim 1 wherein sharing the one or more of the knowledge parameters in the at least two of the sets of knowledge parameters extracted from the at least two of the plurality of edge computing nodes comprises reducing an amount of the knowledge parameters in the at least two of the sets of knowledge parameters extracted from the at least two of the plurality of edge computing nodes that are used in generating sets of controls for the at least two of the plurality of edge computing nodes in the given one of the two or more groups of the plurality of edge computing nodes.

13. The apparatus of claim 1 wherein the given one of the two or more groups of the plurality of edge computing nodes comprises a group of autonomous vehicles, and wherein sharing one or more of the knowledge parameters comprises utilizing vehicle data from one or more representative ones of the autonomous vehicles in the group of autonomous vehicles for performing obstacle analysis.

14. The apparatus of claim 1 wherein the given one of the two or more groups of the plurality of edge computing nodes comprises a group of irrigation control systems, and wherein sharing one or more of the knowledge parameters comprises utilizing at least one of sensor data and control data from one or more representative ones of the irrigation control systems for generating one or more controls for each of the irrigation control systems in the group of irrigation control systems.

15. A computer program product comprising a non-transitory processor-readable storage medium having stored therein program code of one or more software programs, wherein the program code when executed by at least one processing device causes the at least one processing device to perform steps of:
  extracting, from each of a plurality of edge computing nodes in an edge computing environment, a set of knowledge parameters characterizing information generated by a set of one or more additional processing devices associated with that one of the plurality of edge computing nodes;
  generating two or more groups of the plurality of edge computing nodes utilizing at least one clustering algorithm that takes into account the sets of knowledge parameters extracted from each of the plurality of edge computing nodes and physical configurations of the sets of one or more additional processing devices associated with each of the plurality of edge computing nodes, a given one of the two or more groups of the plurality of edge computing nodes comprising at least two of the plurality of edge computing nodes having (i) respective sets of extracted knowledge parameters exhibiting at least a threshold level of similarity with one another and (ii) respective ones of the sets of one or more additional processing devices associated with the at least two of the plurality of edge computing nodes having physical configurations exhibiting at least a threshold level of similarity with one another;
  controlling operation of the at least two of the plurality of edge computing nodes in the given one of the two or more groups of the plurality of edge computing nodes based at least in part on sharing one or more of the knowledge parameters in at least two of the sets of knowledge parameters extracted from the at least two of the plurality of edge computing nodes;
  wherein controlling the operation of the at least two of the plurality of edge computing nodes in the given one of the two or more groups of the plurality of edge computing nodes comprises generating a first instance of a machine learning model for the given one of the two or more groups of the plurality of edge computing nodes based at least in part on the shared one or more of the knowledge parameters in the at least two of the sets of knowledge parameters extracted from the at least two of the plurality of edge computing nodes in the given one of the two or more groups of the plurality of edge computing nodes; and
  wherein the first instance of the machine learning model generated for the given one of the two or more groups of the plurality of edge computing nodes is different than one or more other instances of the machine learning model generated for one or more other ones of the two or more groups of the plurality of edge computing nodes;
  executing the first instance of the machine learning model generated for the given one of the two or more groups of the plurality of edge computing nodes on at least one of the edge computing nodes that is part of the given one of the two or more groups of the plurality of edge computing nodes; and
  executing the one or more other instances of the machine learning model generated for the one or more other ones of the two or more groups of the plurality of edge computing nodes on at least one of the edge computing nodes that is part of each of the one or more other ones of the two or more groups of the plurality of edge computing nodes.

16. The computer program product of claim 15 wherein generating the two or more groups of the plurality of edge computing nodes further comprises, prior to application of the at least one clustering algorithm, performing dimension reduction for the sets of knowledge parameters extracted from each of the plurality of edge computing nodes.

17. The computer program product of claim 15 wherein sharing the one or more of the knowledge parameters in the at least two of the sets of knowledge parameters extracted from the at least two of the plurality of edge computing nodes comprises reducing an amount of the knowledge parameters in the at least two of the sets of knowledge parameters extracted from the at least two of the plurality of edge computing nodes that are at least one of:
  utilized in performing at least one of training and inference for the first instance of the machine learning model generated for the given one of the two or more groups of the plurality of edge computing nodes;
  transmitted from the edge computing environment to one or more cloud computing platforms; and
  used in generating sets of controls for the at least two of the plurality of edge computing nodes in the given one of the two or more groups of the plurality of edge computing nodes.

18. A method comprising:
  extracting, from each of a plurality of edge computing nodes in an edge computing environment, a set of knowledge parameters characterizing information generated by a set of one or more processing devices associated with that one of the plurality of edge computing nodes;

generating two or more groups of the plurality of edge computing nodes utilizing at least one clustering algorithm that takes into account the sets of knowledge parameters extracted from each of the plurality of edge computing nodes and physical configurations of the sets of one or more additional processing devices associated with each of the plurality of edge computing nodes, a given one of the two or more groups of the plurality of edge computing nodes comprising at least two of the plurality of edge computing nodes having (i) respective sets of extracted knowledge parameters exhibiting at least a threshold level of similarity with one another and (ii) respective ones of the sets of one or more additional processing devices associated with the at least two of the plurality of edge computing nodes having physical configurations exhibiting at least a threshold level of similarity with one another;

controlling operation of the at least two of the plurality of edge computing nodes in the given one of the two or more groups of the plurality of edge computing nodes based at least in part on sharing one or more of the knowledge parameters in at least two of the sets of knowledge parameters extracted from the at least two of the plurality of edge computing nodes;

wherein controlling the operation of the at least two of the plurality of edge computing nodes in the given one of the two or more groups of the plurality of edge computing nodes comprises generating a first instance of a machine learning model for the given one of the two or more groups of the plurality of edge computing nodes based at least in part on the shared one or more of the knowledge parameters in the at least two of the sets of knowledge parameters extracted from the at least two of the plurality of edge computing nodes in the given one of the two or more groups of the plurality of edge computing nodes;

wherein the first instance of the machine learning model generated for the given one of the two or more groups of the plurality of edge computing nodes is different than one or more other instances of the machine learning model generated for one or more other ones of the two or more groups of the plurality of edge computing nodes;

executing the first instance of the machine learning model generated for the given one of the two or more groups of the plurality of edge computing nodes on at least one of the edge computing nodes that is part of the given one of the two or more groups of the plurality of edge computing nodes; and executing the one or more other instances of the machine learning model generated for the one or more other ones of the two or more groups of the plurality of edge computing nodes on at least one of the edge computing nodes that is part of each of the one or more other ones of the two or more groups of the plurality of edge computing nodes; and wherein the method is performed by at least one additional processing device comprising a processor coupled to a memory.

19. The method of claim 18 wherein generating the two or more groups of the plurality of edge computing nodes further comprises, prior to application of the at least one clustering algorithm, performing dimension reduction for the sets of knowledge parameters extracted from each of the plurality of edge computing nodes.

20. The method of claim 18 wherein sharing the one or more of the knowledge parameters in the at least two of the sets of knowledge parameters extracted from the at least two of the plurality of edge computing nodes comprises reducing an amount of the knowledge parameters in the at least two of the sets of knowledge parameters extracted from the at least two of the plurality of edge computing nodes that are at least one of:

utilized in performing at least one of training and inference for the first instance of the machine learning model generated for the given one of the two or more groups of the plurality of edge computing nodes;

transmitted from the edge computing environment to one or more cloud computing platforms; and used in generating sets of controls for the at least two of the plurality of edge computing nodes in the given one of the two or more groups of the plurality of edge computing nodes.

\* \* \* \* \*